(12) United States Patent
Shin

(10) Patent No.: US 12,261,502 B2
(45) Date of Patent: Mar. 25, 2025

(54) MOTOR

(71) Applicant: LG INNOTEK CO., LTD., Seoul (KR)

(72) Inventor: Dong Hyun Shin, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 241 days.

(21) Appl. No.: 17/754,935

(22) PCT Filed: Oct. 14, 2020

(86) PCT No.: PCT/KR2020/014004
§ 371 (c)(1),
(2) Date: Apr. 15, 2022

(87) PCT Pub. No.: WO2021/075849
PCT Pub. Date: Apr. 22, 2021

(65) Prior Publication Data
US 2022/0393545 A1 Dec. 8, 2022

(30) Foreign Application Priority Data

Oct. 15, 2019 (KR) .......................... 10-2019-0127905

(51) Int. Cl.
*H02K 5/22* (2006.01)
*H02K 5/15* (2006.01)
(Continued)

(52) U.S. Cl.
CPC ............ *H02K 5/225* (2013.01); *H02K 5/15* (2013.01); *H02K 5/161* (2013.01); *H02K 7/083* (2013.01); *H02K 2213/03* (2013.01)

(58) Field of Classification Search
CPC .......... H02K 5/225; H02K 5/15; H02K 5/161; H02K 7/083; H02K 2203/09
See application file for complete search history.

(56) References Cited

U.S. PATENT DOCUMENTS

| 2015/0188377 A1* | 7/2015 | Kim ..................... H02K 29/03 |
| | | 417/415 |
| 2017/0126092 A1* | 5/2017 | Han ..................... H02K 5/225 |
| 2023/0155439 A1* | 5/2023 | Park ..................... H02K 3/50 |
| | | 310/71 |

FOREIGN PATENT DOCUMENTS

| EP | 3 166 212 A1 | 5/2017 | |
| JP | 4914618 B2 * | 4/2012 | ............ H01R 4/183 |

(Continued)

OTHER PUBLICATIONS

International Search Report dated Jan. 20, 2021 in International Application No. PCT/KR2020/014004.

(Continued)

*Primary Examiner* — Jeremy A Luks
(74) *Attorney, Agent, or Firm* — Saliwanchik, Lloyd & Eisenschenk

(57) ABSTRACT

The present invention may provide a motor including a shaft, a rotor coupled to the shaft, a stator disposed to correspond to the rotor, a busbar disposed above the stator, a cover disposed above the busbar, and a power terminal unit coupled to the cover and electrically connected to the busbar, wherein the busbar includes a first terminal, the power terminal unit includes a second body and a second terminal disposed on the second body, the cover includes a first hole, and a first end portion of the first terminal, which passes through the first hole and is disposed in the second body, and a second end portion of the second terminal are in contact with each other in the second body.

11 Claims, 13 Drawing Sheets

(51) Int. Cl.
*H02K 5/16* (2006.01)
*H02K 7/08* (2006.01)

(56) References Cited

FOREIGN PATENT DOCUMENTS

| | | | |
|---|---|---|---|
| JP | 2014-103759 A | | 6/2014 |
| JP | 2019-68572 A | | 4/2019 |
| JP | 2019-115123 A | | 7/2019 |
| JP | 2019-135903 A | | 8/2019 |
| JP | 2019-176557 A | | 10/2019 |
| KR | 20160003717 U | * | 10/2016 |
| KR | 10-2017-0034082 A | | 3/2017 |
| KR | 10-2017-0052013 A | | 5/2017 |
| KR | 10-1917961 B1 | | 11/2018 |
| WO | 2013/065577 A1 | | 5/2013 |

OTHER PUBLICATIONS

Supplementary European Search Report dated Nov. 17, 2022 in European Application No. 20876940.6.
Office Action dated Sep. 24, 2024 in Japanese Application No. 2022-522753.
Office Action dated Aug. 30, 2024 in Korean Application No. 10-2019-0127905.

* cited by examiner

MOTOR

CROSS-REFERENCE TO RELATED APPLICATIONS

This application is the U.S. national stage application of International Patent Application No. PCT/KR2020/014004, filed Oct. 14, 2020, which claims the benefit under 35 U.S.C. § 119 of Korean Application No. 10-2019-0127905, filed Oct. 15, 2019, the disclosures of each of which are incorporated herein by reference in their entirety.

TECHNICAL FIELD

The present invention relates to a motor.

BACKGROUND ART

A motor may include a rotary shaft, a rotor, a stator, a housing, and a cover. The rotor and the stator are accommodated in the housing. The housing is a cylindrical member having an open upper portion. The bearing plate covers the open upper portion of the housing. A busbar may be disposed above the stator. Terminals of the busbar are connected to a coil wound around the stator and a terminal disposed on a cover. The terminal disposed on the cover is connected to an external power source.

The cover and the bearing plate may be disposed to be spaced a considerable distance from each other in an axial direction due to a length of the rotary shaft exposed upward from the bearing plate. Accordingly, the terminal of the busbar may include an end portion formed to extend upward to reach the terminal of the cover.

However, the motor having such a structure has the following problems.

Since a hole through which the end portion of the terminal of the busbar passes is disposed in the bearing plate, there is a problem in that foreign matter may be introduced through a gap between the end portion of the terminal of the busbar and the hole.

In addition, since a length of the end portion of the terminal of the busbar is quite long, when the stator is hot-pressed into the housing, there is a problem in that the end portion of the terminal of the busbar in contact with the terminal of the housing cover is twisted when a position of the stator is misaligned.

In addition, since a position in the axial direction of the end portion of the terminal of the busbar in contact with the terminal of the housing cover changes according a position of the stator in the axial direction, there is problem of difficulty in tolerance management.

In addition, since the end portion of the terminal of the busbar is disposed long, the end portion of the terminal of the busbar has a structural problem of easily bending.

In addition, since the end portion of the terminal of the busbar is disposed long, there is a problem of generating a large amount of scraps of a plate material when the terminal of the busbar is manufactured.

In addition, although a cut surface of the plate material of the terminal of the busbar connected to the coil of the stator does not need to be plated after a pressing process is performed on the plate material, since a cut surface of the end portion of the terminal of the busbar in contact with the terminal of the cover of the housing needs to be plated after the pressing process is performed, a plating process is performed on all terminals of the busbar after the pressing process is performed, and thus there is a problem that a cost greatly increases.

Technical Problem

The present invention is directed to providing a motor of which a terminal structure from a stator to a terminal of a housing cover is simplified.

Technical Solution

One aspect of the present invention provides a motor including a shaft, a rotor coupled to the shaft, a stator disposed to correspond to the rotor, a busbar disposed above the stator, a cover disposed above the busbar, and a power terminal unit coupled to the cover and electrically connected to the busbar, wherein the busbar includes a first terminal, the power terminal unit includes a second body and a second terminal disposed on the second body, the cover includes a first hole, and a first end portion of the first terminal, which passes through the first hole and is disposed in the second body, and a second end portion of the second terminal are in contact with each other in the second body.

The second body may include a second slot formed in a lower end of the second body, and the first end portion of the first terminal may be inserted into the second slot.

The second body may include a second hole, and the first end portion and the second end portion may be disposed in contact with each other in the second hole and exposed to an outside through the second hole.

An embossing portion may be disposed on the second end portion of the second terminal.

The cover may include third holes, the second body may include a first part disposed outside the second terminal and a second part extending downward from the first part, and the second part may include first protrusions coupled to the third holes.

A size of a lower surface of the second part may be greater than a size of the first hole, and the lower surface of the second part may cover an entire region of the first hole in a state in which the lower surface of the second part is in contact with an upper surface of the cover.

In a radial direction about a central axis of the cover, at least some of the plurality of first protrusions may be disposed at positions different from positions of the remaining first protrusions, and at least some of the plurality of third holes may be disposed at positions different from positions of the remaining third holes.

In a circumferential direction about the central axis of the cover, at least some of the plurality of first protrusions may be disposed at different positions, and at least some of the plurality of third holes may be disposed at different positions.

The third holes may include a first third hole and a second third hole, the first third hole may be disposed closer to a central axis of the cover than the second third hole, and in a radial direction about a central axis of the cover, the first third hole may be disposed to not overlap the first hole, and the second third hole may be disposed to overlap the first hole.

In a radial direction of a central axis of the cover, any one of the first end portion and the second end portion may be disposed at an inner side, and the other may be disposed at an outer side.

The second body may include a first slot in which the second terminal is disposed, the first slot may communicate with the first hole, and each of the first slot and the second slot may be connected to the second hole.

The second terminal may include a plurality of grooves concavely disposed on a side surface, and the second body may include second protrusions disposed in the plurality of grooves.

The cover may include a fourth hole, and a housing may include a fifth hole which is aligned with the fourth hole in a state in which the first end portion is disposed in the second body.

Advantageous Effects

According to embodiments, an advantageous effect of inhibiting foreign matter from being introduced through a gap between an end portion of a terminal of a busbar and a hole is provided. According to the embodiments, an advantageous effect in that cumulative tolerance management is easy at the end portion of the terminal of the busbar in contact with a terminal of a cover is provided.

According to the embodiments, an advantageous effect of high rigidity against bending is provided.

According to the embodiments, an advantageous effect of decreasing an amount of scraps generated from a plate material is provided.

According to the embodiments, an advantageous effect of decreasing a plating cost is provided.

MODES OF THE INVENTION

Hereinafter, a direction parallel to a longitudinal direction (vertical direction) of a shaft is referred to as an axial direction, a direction perpendicular to the axial direction based on the shaft is referred to as a radial direction, and a direction along a circumference of a circle having a radius in the radial direction based on the shaft is referred to as a circumferential direction.

Figure 1:
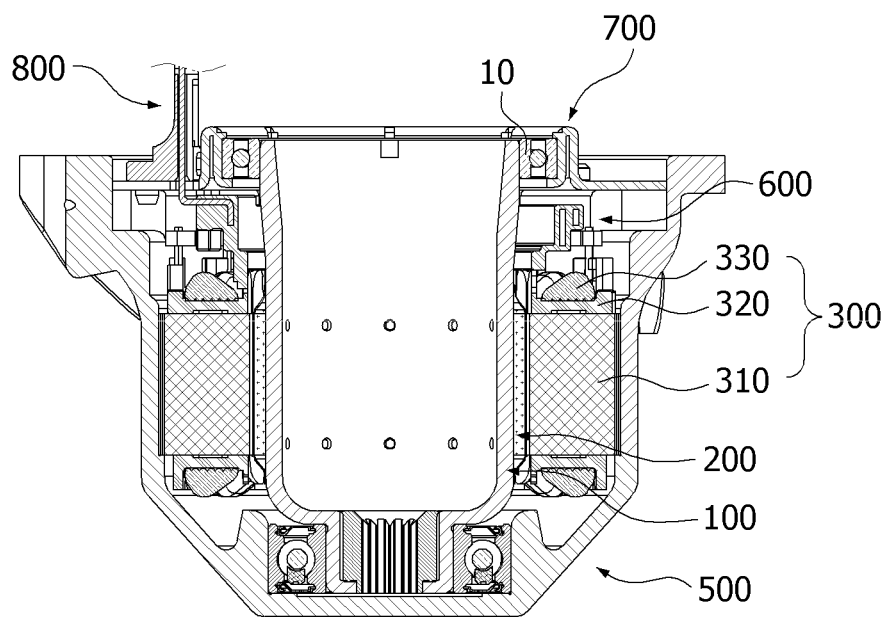
FIG. 1 is a view illustrating a motor according to the embodiment.

FIG. 1 is a view illustrating a motor according to the embodiment.

Referring to FIG. 1, the motor according to the embodiment may include a rotor 200, magnets 200, a stator 300, a housing 500, a busbar 600, a cover 700, and a power terminal unit 800. Hereinafter, the term "inward" refers to a direction toward a rotary shaft 100 in the radial direction of the motor, and the term "outward" refers to a direction opposite to "inward."

The rotary shaft 100 may be a hollow member having one open side. In the axial direction, both ends of the rotary shaft 100 may be rotatably supported by bearings. Portions with different outer diameters may be disposed separately on the rotary shaft 100 in the axial direction.

The rotor 200 is a member disposed on an outer circumferential surface of the rotary shaft 100 and may be magnets rotating in conjunction with rotation of the rotary shaft 100.

The stator 300 is disposed outside the rotary shaft 100 and the magnets 200. The stator 300 may include a stator core 310, insulators 320 installed on the stator core 310, and coils 330 wound around the insulators 320. The coils 330 form electric fields. The stator core 310 may be a single member or a plurality of divided cores that are combined. In addition, the stator core 310 may be formed in the form in which a plurality of thin steel plates are stacked but is not limited thereto. For example, the stator core 310 may be formed as one single unit.

When the rotor 200 is the magnets, the cover 400 fixes the magnets to the rotary shaft 100. The cover 400 surrounds some regions of the magnets and the rotary shaft 100. The cover 400 may be a molding member formed by an over molding process, a can member surrounding the magnets, or an adhesive member.

The housing 500 may be disposed outside the stator 300. The housing 500 may be a cylindrical member having an open upper portion. The rotary shaft 100, the magnets 200, the stator 300, and the cover 400 are accommodated in the housing 500. In addition, the housing 500 may accommodate the bearings supporting the rotary shaft 100.

The busbar 600 is disposed above the stator 300. The busbar 600 connects the coils 330 wound around the stator 300.

The cover 700 is disposed above the busbar 600. The bearing 10 is accommodated in the cover 700.

The power terminal unit 800 is disposed above the cover 700.

Figure 2:
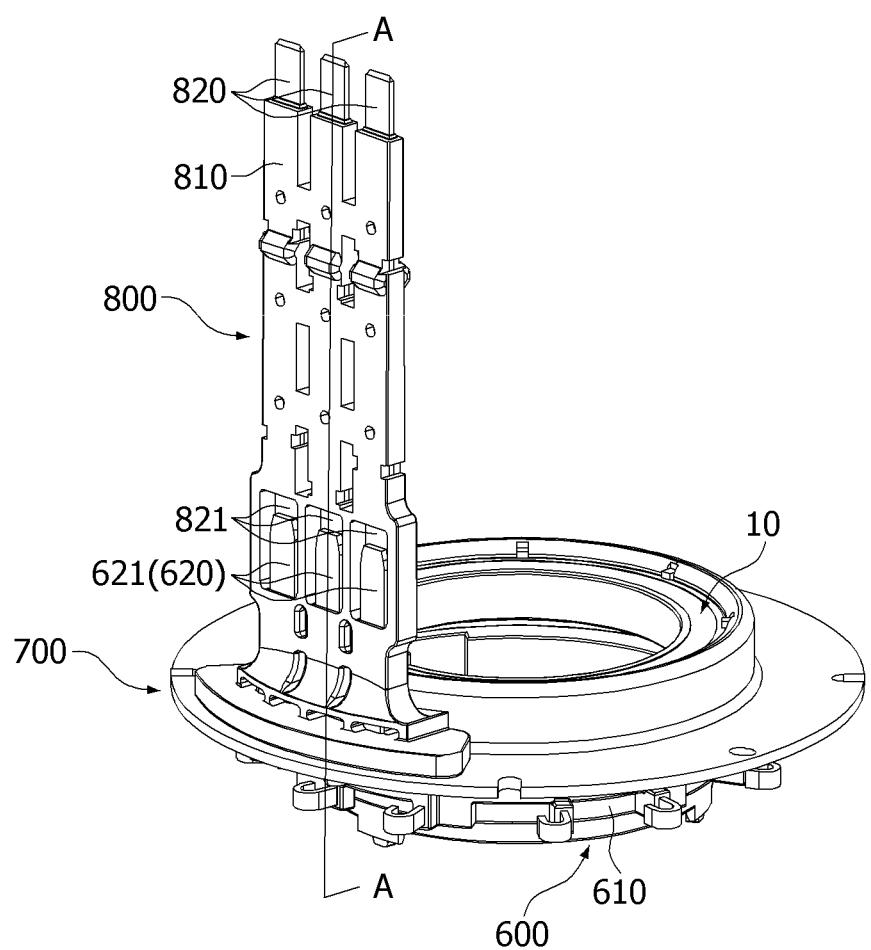
FIG. 2 is a view illustrating a state in which a busbar, a cover, and a power terminal unit are coupled to each other.
Figure 3:
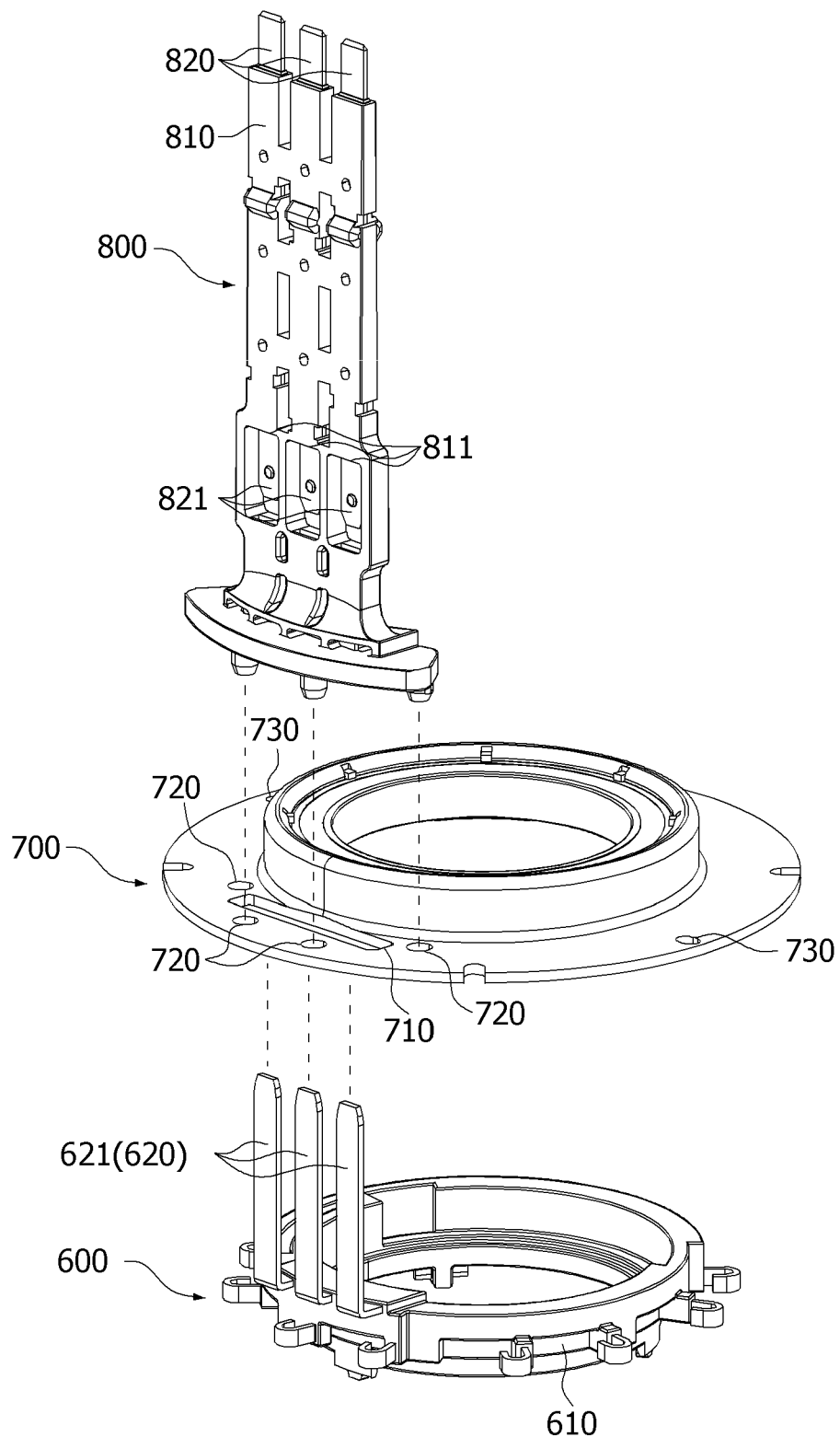
FIG. 3 is a view illustrating the busbar, the cover, and the power terminal unit before the busbar, the cover, and the power terminal unit are coupled.

FIG. 2 is a view illustrating a state in which the busbar 600, the cover 700, and the power terminal unit 800 are coupled to each other, and FIG. 3 is a view illustrating the busbar 600, the cover 700, and the power terminal unit 800 before the busbar 600, the cover 700, and the power terminal unit 800 are coupled.

Referring to FIGS. 2 and 3, the busbar 600 may be disposed below the cover 700. The busbar 600 may include a first body 610 and a first terminal 620. The first body 610 may be a molding member having an annular shape. The first terminal 620 may be connected to an end portion of the coil 330. In addition, first end portions 621 of the first terminal 620 are in contact with the power terminal unit 800. The first end portions 621 are disposed to extend upward. Three first end portions 621 may be connected to U-phase, V-phase, and W-phase power sources.

The cover 700 may include a first hole 710. The first hole 710 is formed to pass through an upper surface and a lower surface of the cover 700.

The power terminal unit 800 includes a second body 810 and second terminals 820 disposed on the second body 810. The second body 810 surrounds the second terminals 820. The second body 810 may be a molding member disposed to extend vertically. The second body 810 is coupled to the cover 700.

The second terminals 820 are connected to external power sources or terminals of a housing cover connected to external power sources. The second terminals 820 are fixed to the second body 810. Second end portions 821 of the second terminals 820 are in contact with the first end portions 621.

The power terminal unit 800 is a unit separate from the busbar 600. The power terminal unit 800 is disposed above the cover 700. The busbar 600 is disposed below the cover 700.

Figure 4:
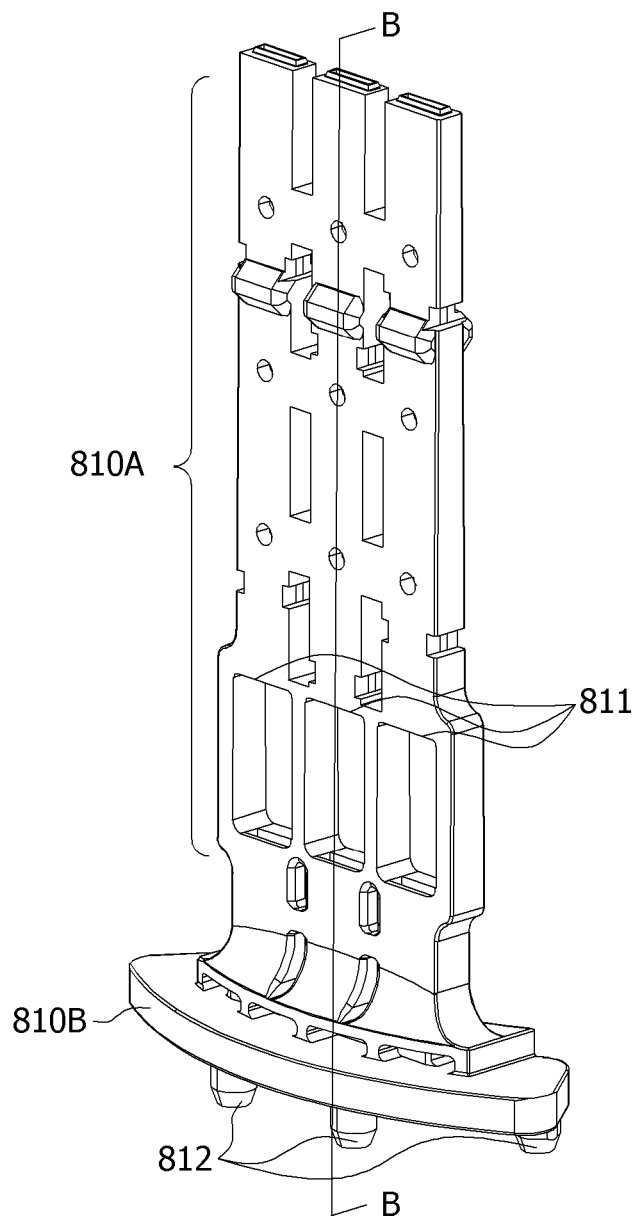
FIG. 4 is a view illustrating a second body of the power terminal unit.

FIG. 4 is a view illustrating the second body 810 of the power terminal unit 800.

Referring to FIG. 4, the second body 810 may include a first part 810A and a second part 810B. The first part 810A is disposed outside the second terminals 820 and surrounds the second terminals 820. The second part 810B extends from a lower side of the first part 810A and is coupled to the cover 700.

The first part 810A includes second holes 811. The second holes 811 are holes for exposing the first end portions 621 of the first terminal 620 and the second end portions 821 of the second terminals 820 for fusing. The first end portions 621 and the second end portions 821 are disposed in contact with each other in the second holes 811.

The second part 810B may include a plurality of first protrusions 812. The first protrusions 812 are disposed to protrude from a lower surface of the second part 810B.

Figure 5:
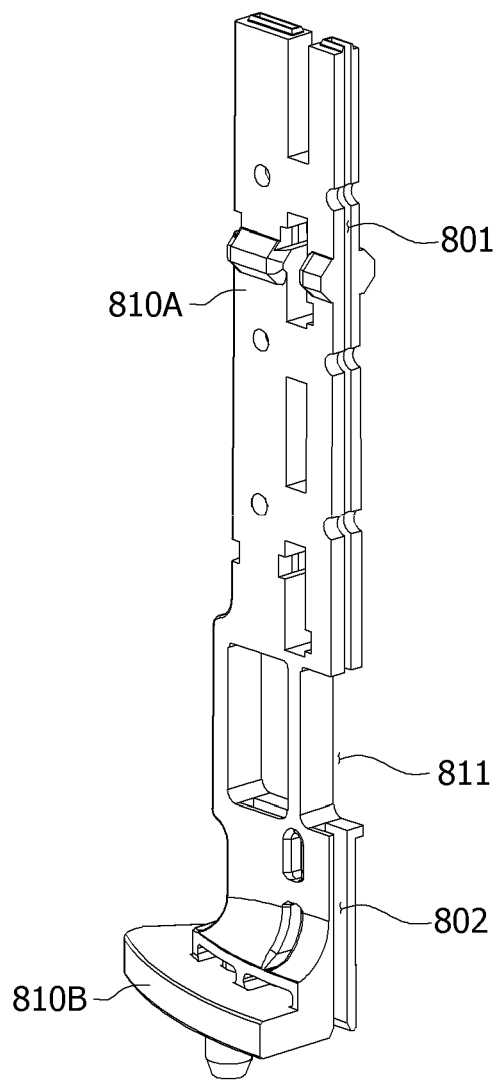
FIG. 5 is a side cross-sectional view illustrating the second body of the power terminal unit, which is taken along line B-B of FIG. 4.

FIG. 5 is a side cross-sectional view illustrating the second body 810 of the power terminal unit 800, which is taken along line B-B of FIG. 4.

Referring to FIG. 5, the second body 810 may include first slots 801 and second slots 802. The first slots 801 are disposed in the first part 810A. The second slots 802 are disposed from the first part 810A to the second part 810B.

The second terminals 820 are disposed in the first slots 801. In a state in which the second terminals 820 are disposed in the first slots 801, the second end portions 821 of the second terminals 820 are positioned in the second holes 811.

The second slots 802 communicate with the first hole 710. In addition, the second slots 802 are disposed above the first hole 710. The first end portions 621 of the first terminal 620 are disposed in the second slots 802. In a state in which the first end portions 621 are disposed in the second slots 802, ends of the first end portions 621 are positioned in the second holes 811. The second slots 802 guide the ends of the first end portions 621 to the second holes 811.

Figure 6:
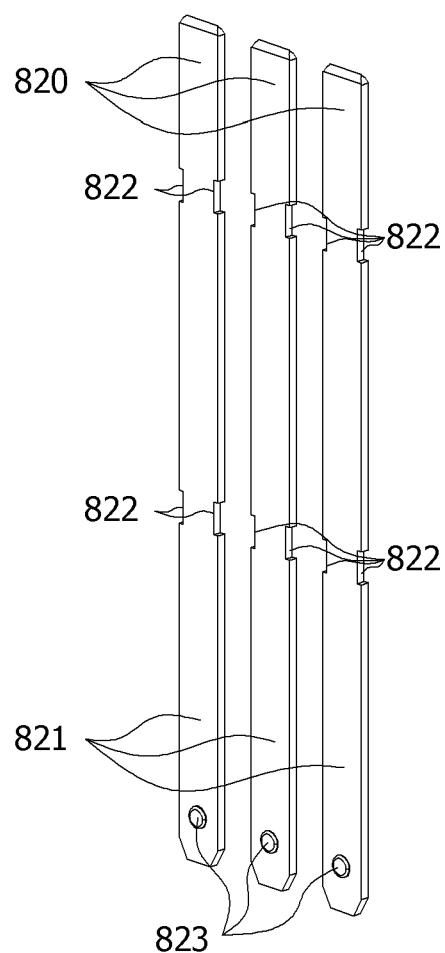
FIG. 6 is a view illustrating a second terminal.

FIG. 6 is a view illustrating the second terminals 820.

In FIG. 6, the second terminals 820 are three terminal members connected to the U-phase, V-phase, and W-phase power sources. The second terminals 820 are disposed to extend vertically. The second terminals 820 may include a plurality of grooves 822. The grooves 822 may be concavely formed in side edges of the second terminals 820. The grooves 822 increase coupling forces between the second body 810 and the second terminals 820. Embossing portions 823 may be disposed in the second end portions 821 of the second terminals 820. The embossing portions 823 are portions that increase bonding forces between the first end portions 621 and the second end portions 821 in fusing.

Since the second terminals 820 are separate from the first terminal 620, an amount of scraps of a plate member may be significantly reduced by simplifying a shape of a sheet metal of the first terminal 620 and a shape of a sheet metal of the second terminals 820.

Particularly, the three second terminals 820 have the same shape and size. In addition, the three second terminals 820 are members having quadrangular plate shapes with straight line edges. Accordingly, an amount of scraps of the plate member generated after a pressing process is performed on the second terminals 820 may be significantly reduced.

In addition, since three second terminals 820 have the same shape and size, dimension management is easy, and thus there is an advantage of reducing cumulative tolerance.

Meanwhile, a process of plating cut surfaces of end portions of the second terminals 820 in contact with the terminals of the cover of the housing (hereinafter, a post plating process) needs to be performed after the pressing process is performed. Since the second terminals 820 are units separate from the first terminal 620, the post plating process, of which a cost is relatively high, may be performed on only the second terminals 820, and thus there is an advantage of significantly reducing a plating cost.

Figure 7:
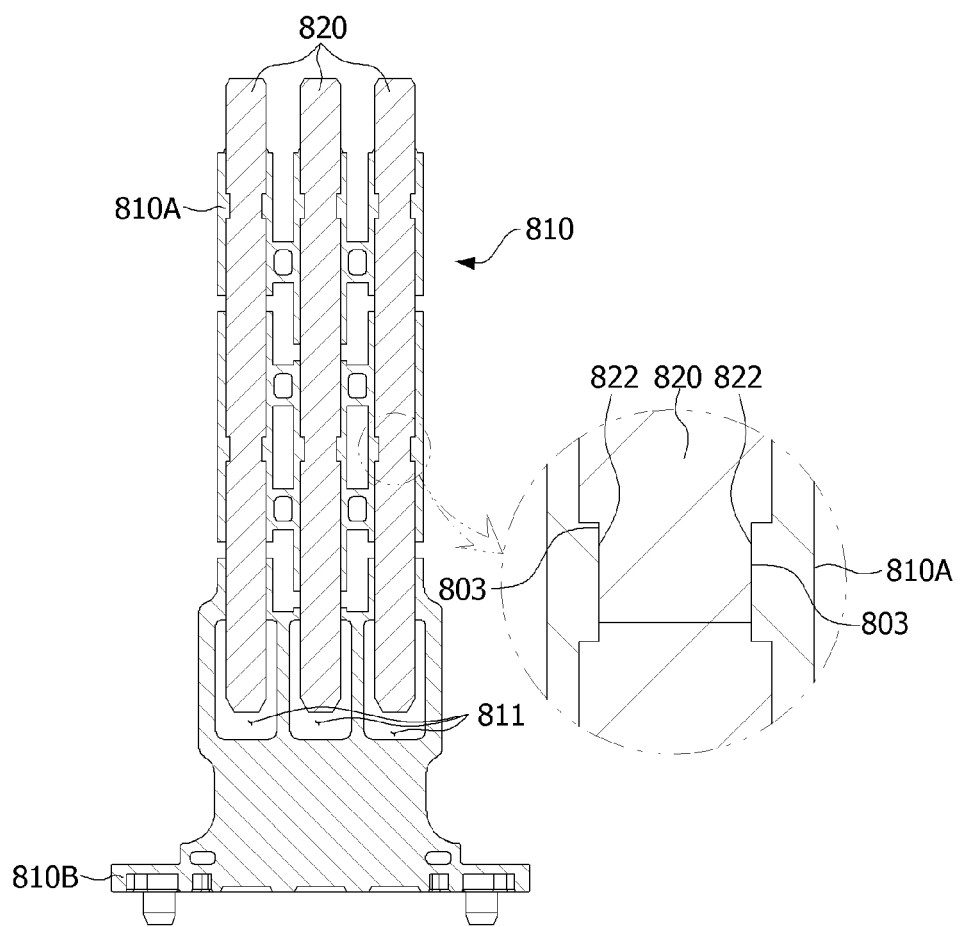
FIG. 7 is a cross-sectional view illustrating a state in which a protrusion of the second body is disposed in a groove of the second terminal.

FIG. 7 is a cross-sectional view illustrating a state in which protrusions of the second body 810 are disposed in the grooves 822 of the second terminals 820.

Referring to FIG. 7, the second body 810 may include second protrusions 803 on inner walls. The second protrusions 803 are inserted into the grooves 822 to restrict the second terminals 820 in a vertical direction and inhibit the second terminals 820 from departing from the second body 810.

Figure 8:
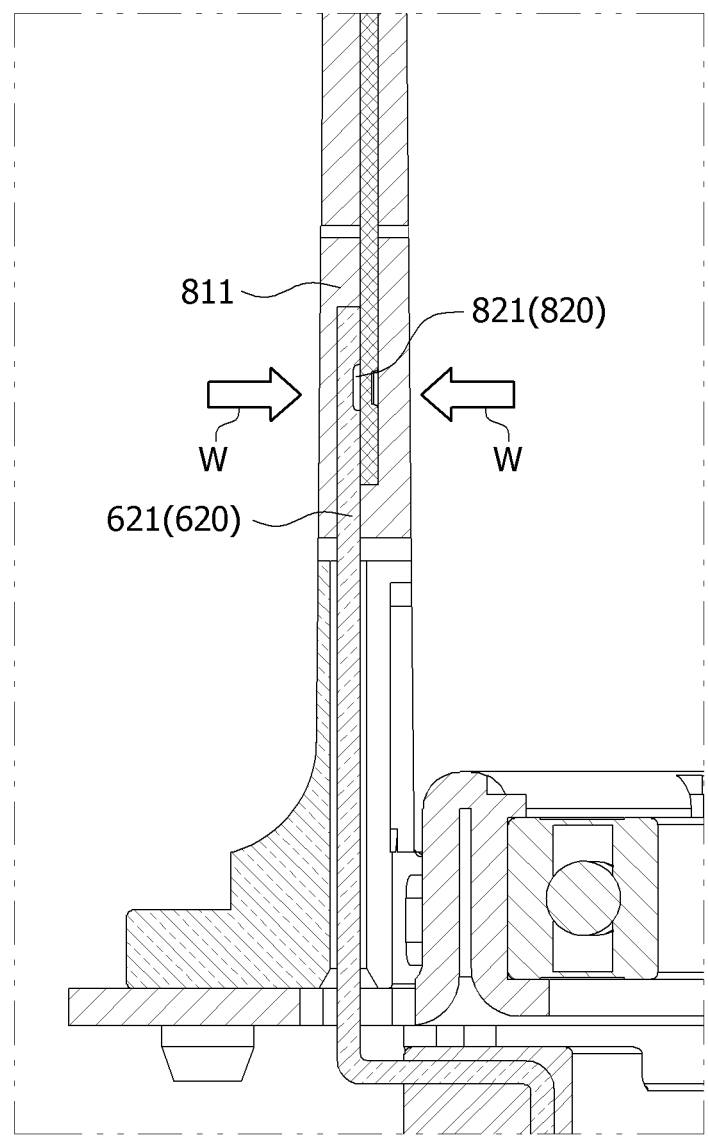
FIG. 8 is a view illustrating a state in which a first end portion of a first terminal is in contact with a second end portion of the second terminal in a second hole.

FIG. 8 is a view illustrating a state in which the first end portion 621 of the first terminal 620 is in contact with the second end portion 821 of the second terminal 820 in the second hole 811.

Referring to FIG. 8, the first end portion 621 of the first terminal 620 and the second end portion 821 of the second terminal 820 overlap and are in contact with each other in the second hole 811. In the radial direction about a central axis C of the cover 700, the first end portion 621 may be disposed at an outer side, and the second end portion 821 may be disposed at an inner side. When a welding rod presses the first end portion 621 and the second end portion 821 in directions of arrows W of FIG. 8, the first terminal 620 and the second terminal 820 are fused and connected. Since each of the first end portion 621 and the second end portion 821 is formed in a plate shape of which a width is greater than a thickness, a contact area for fusing may be sufficiently secured.

Figure 9:
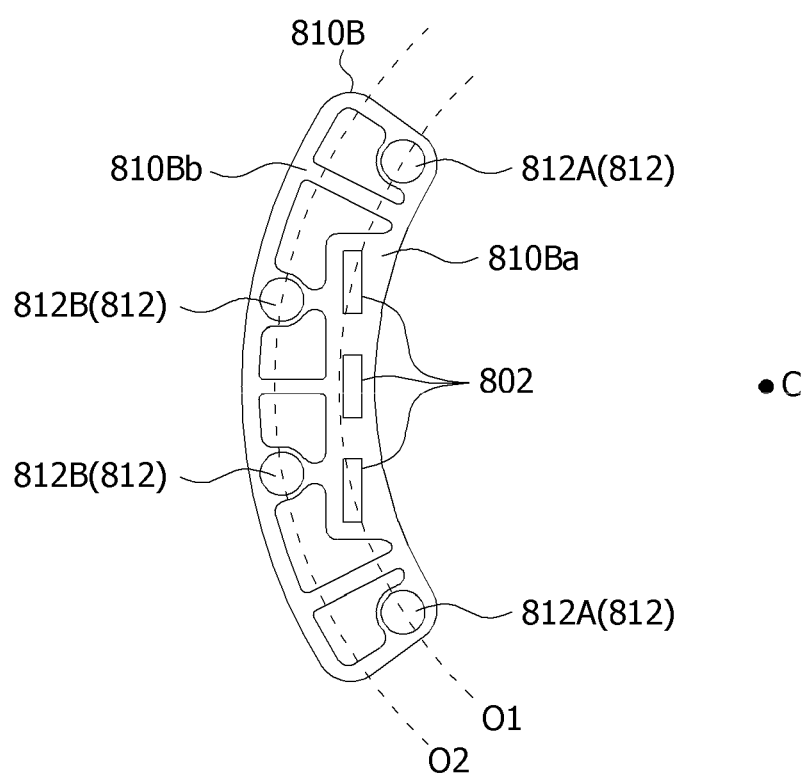
FIG. 9 is a bottom view illustrating the second body on which first protrusions are disposed.

FIG. 9 is a bottom view illustrating the second body 810 on which the first protrusions 812 are disposed.

Referring to FIGS. 3 and 9, the plurality of first protrusions 812 may be disposed on a bottom surface of the second part 810B of the second body 810. The first protrusions 812 may include a plurality of first first protrusions 812A and a plurality of second first protrusions 812B. The first first protrusions 812A may be disposed at a relatively inner side to be closer to the central axis C of the cover 700 than the second first protrusions 812B. For example, the plurality of first first protrusions 812A may be disposed on a first circular orbit O1 about the central axis C of the cover 700. In addition, the plurality of second first protrusions 812B may be disposed on a second circular orbit O2 which is formed about the central axis C of the cover 700 and has a larger radius than the first circular orbit O1.

Meanwhile, an inner edge of the second part 810B may be an inner circumferential surface about the central axis C of the cover 700, and an outer edge of the second part 810B may be an outer circumferential surface about the central axis C of the cover 700.

Figure 10:
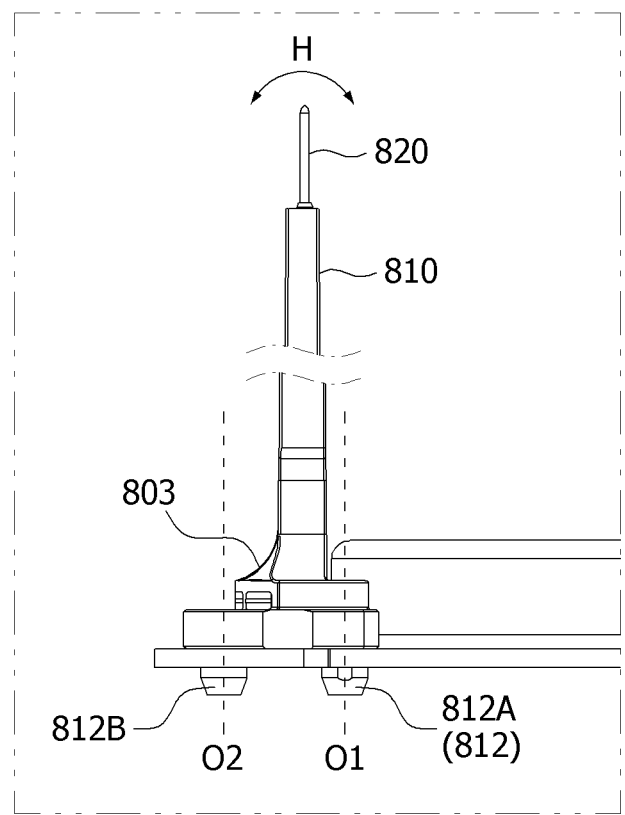
FIG. 10 is a side view illustrating the second body coupled to the cover.

FIG. 10 is a side view illustrating the second body 810 coupled to the cover 700.

Referring to FIGS. 3, 9, and 10, the first first protrusions 812A and the second first protrusions 812B are disposed apart from each other in the radial direction about the central axis C of the cover 700. The second body 810 and the second terminal 820 are disposed to extend vertically. In addition, since three second terminals 820 are disposed in a width direction, and the second terminals 820 have the flat plate shapes of which a thickness is smaller than a width, the second terminals 820 may be easily bent inward or outward in a direction of a double arrow H of FIG. 10, but since the first first protrusions 812A and the second first protrusions 812B are disposed in double column shapes in the radial direction, there is an advantage of increasing rigidity against bending.

In addition, since a horizontal cross-sectional size of the second part 810B is greater than a horizontal cross-sectional size of the first part 810A, there is an advantage of improving structural stability. Particularly, since a portion at which the first part 810A is connected to the second part 810B is formed as a curved surface 804, there is an advantage of further improving structural stability against bending.

Meanwhile, since the horizontal cross-sectional size of the second part 810B is greater than a size of the first hole 710 so that the bottom surface of the second part 810B completely covers the first hole 710, there is an advantage of inhibiting foreign matter from being introduced through a gap between an end portion of the terminal of the busbar 600 and the hole.

Figure 11:
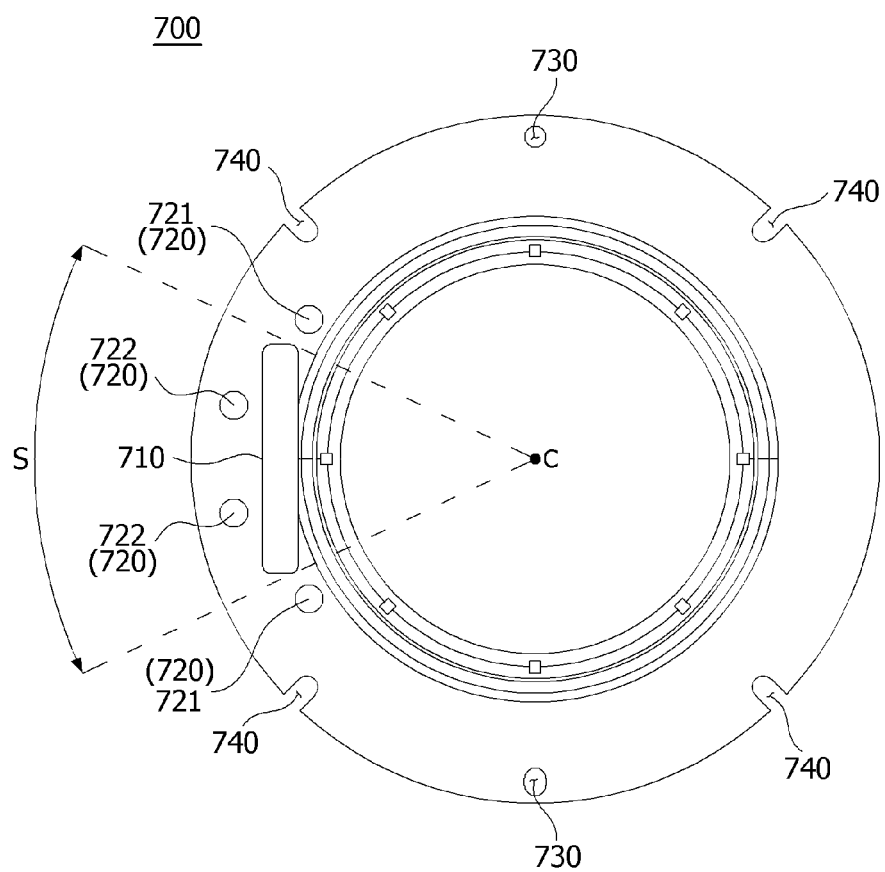
FIG. 11 is a plan view illustrating the cover.

FIG. 11 is a plan view illustrating the cover 700.

Referring to FIGS. 3 and 11, the cover 700 may include a plurality of third holes 720 into which the first protrusions 812 are inserted. The third holes 720 are formed to pass through the upper surface and the lower surface of the cover 700. The third holes 720 may be disposed adjacent to the first hole 710. The third holes 720 may include first third holes 721 and second third holes 722.

The first third holes 721 may be disposed closer to the central axis C of the cover 700 than the second third holes 722. In addition, in the radial direction about the central axis C of the cover 700, the first third holes 721 may be disposed to not overlap the first holes 710, and the second third holes 722 may be disposed in a region S overlapping the first hole 710.

Positions of the third holes 720 correspond to positions of the first protrusions 812.

Meanwhile, a plurality of bolt fastening holes 740 may be disposed in the cover 700.

Figure 12:
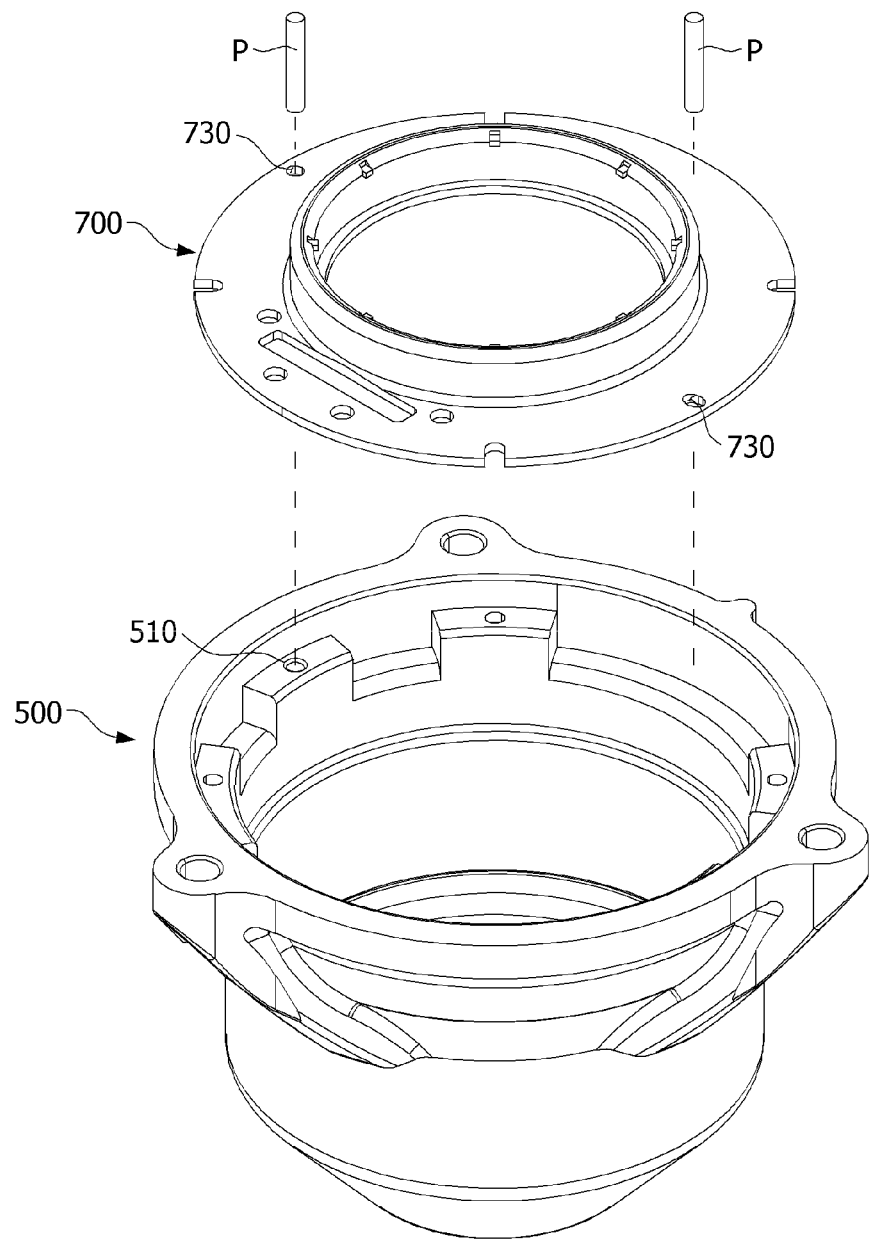
FIG. 12 is a view illustrating a process of arranging the cover and a housing.
Figure 13:
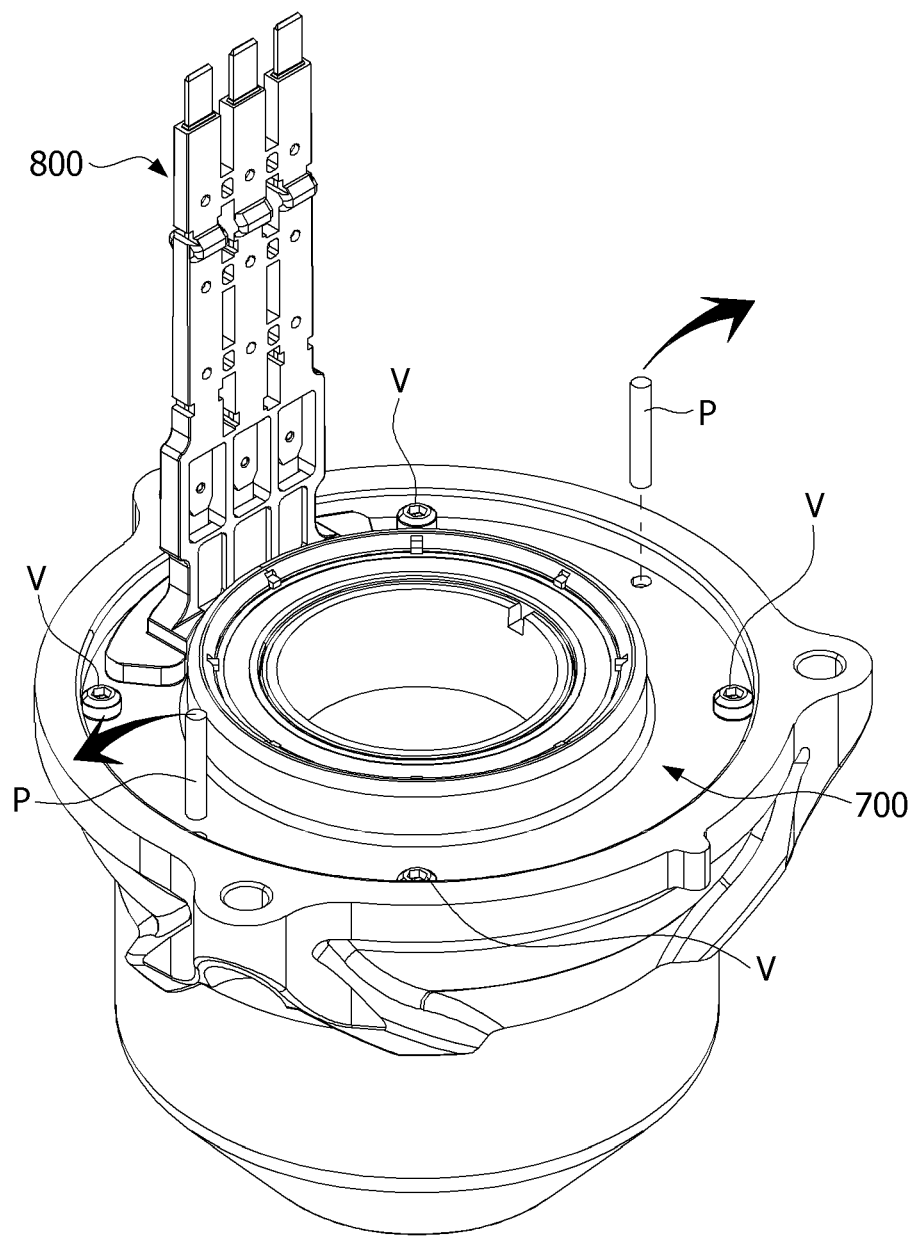
FIG. 13 is a view illustrating a state in which the cover and the housing are coupled.

FIG. 12 is a view illustrating a process of arranging the cover 700 and the housing 500, and FIG. 13 is a view illustrating a state in which the cover 700 and the housing 500 are coupled.

Referring to FIGS. 11 to 13, the cover 700 may include a plurality of fourth holes 730. The fourth holes 730 are formed to pass through the upper surface and the lower surface of the cover 700. The fourth holes 730 are holes for aligning the first end portions 621 of the first terminal 620 and the second end portions 821 of the second terminals 820.

A plurality of fifth holes 510 are disposed in the housing 500. In a state in which the fourth holes 730 and the fifth holes 510 are aligned, positions of the upper ends of the second terminals 820 are aligned with the terminals of the cover of the housing or with the terminals of the external power source.

In a state in which the power terminal unit 800 is coupled to the cover 700, when pins P pass through the fourth holes 730 of the cover 700 and are inserted into the fifth holes 510 of the housing 500, a tolerance of the positions of the upper ends of the second terminals 820 can be reduced. In a state in which the pins P are inserted into the fourth holes 730 and the fifth holes 510, bolts V may be fastened to the bolt fastening holes 740 to fix the cover 700 to the housing 500. In a state in which the bolts V are fastened, the pins are removed.

In the above-described embodiment, an example of an inner rotor type motor has been described, but the present invention is not limited thereto. The present invention may also be applied to an outer rotor type motor. In addition, the present invention may be used in various devices for vehicles, home appliances, or the like.

The invention claimed is:

1. A motor comprising:
   a shaft;
   a rotor coupled to the shaft;
   a stator disposed to correspond to the rotor;
   a busbar disposed above the stator;
   a cover disposed above the busbar; and
   a power terminal unit coupled to the cover and electrically connected to the busbar,
   wherein the busbar includes a first terminal,
   wherein the power terminal unit includes a first body and a second terminal disposed on the first body,
   wherein the cover includes a first hole, and
   wherein a first end portion of the first terminal, which passes through the first hole and is disposed in the first body, and a second end portion of the second terminal are in contact with each other in the first body,
   wherein the first body includes a first part disposed outside the second terminal and a second part extending downward from the first part, wherein the second part covers the first hole,
   wherein the first part includes a second hole, and the first end portion and the second end portion are disposed in contact with each other in the second hole and exposed to an outside through the second hole, and
   wherein a lower surface of the second part covers an entire region of the first hole such that the lower surface of the second part is in contact with an upper surface of the cover that is configured to inhibit foreign matter from entering through a gap between the first end portion of the first terminal of the busbar and the first hole.

2. The motor of claim 1, wherein:
   the first body includes a first slot formed in a lower end of the first body; and
   the first end portion of the first terminal is inserted into the first slot.

3. The motor of claim 2, wherein:
   the first body includes a second slot in which the second terminal is disposed, the second slot communicates with the first hole, and each of the first slot and the second slot is connected to the second hole.

4. The motor of claim 1, wherein an embossing portion is disposed on the second end portion of the second terminal.

5. The motor of claim 1, wherein:
the cover includes a plurality of third holes; and
the second part includes a plurality of first protrusions coupled to the plurality of third holes, respectively.

6. The motor of claim 5, wherein:
a size of a lower surface of the second part is greater than a size of the first hole.

7. The motor of claim 5, wherein, in a radial direction about a central axis of the cover:
at least some of the plurality of first protrusions are disposed at positions different from positions of the remaining first protrusions; and
at least some of the plurality of third holes are disposed at positions different from positions of the remaining third holes.

8. The motor of claim 7, wherein, in a circumferential direction about the central axis of the cover:
at least some of the plurality of first protrusions are disposed at different positions; and
at least some of the plurality of third holes are disposed at different positions.

9. The motor of claim 5, wherein:
the plurality of third holes include a first third hole and a second third hole;
the first third hole is disposed closer to a central axis of the cover than is the second third hole; and
in a radial direction about a central axis of the cover, the first third hole is disposed to not overlap the first hole, and the second third hole is disposed to overlap the first hole.

10. The motor of claim 1, wherein, in a radial direction of a central axis of the cover:
any one of the first end portion and the second end portion is disposed at an inner side; and
the other is disposed at an outer side.

11. The motor of claim 1, wherein the first part includes a second hole, wherein the first end portion and the second end portion are disposed in contact with each other in the second hole and exposed to an outside through the second hole.

* * * * *